Patented Feb. 17, 1948

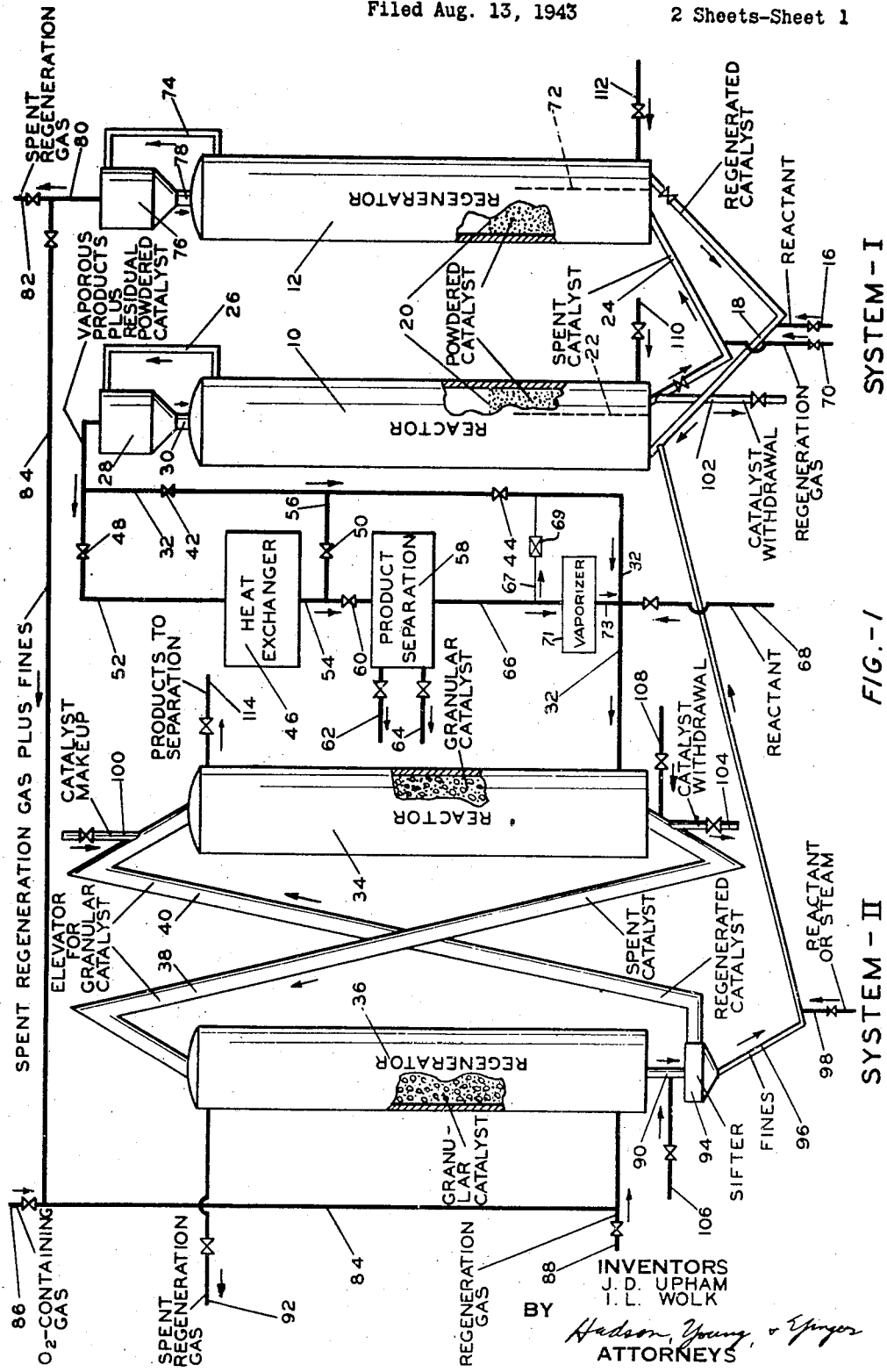

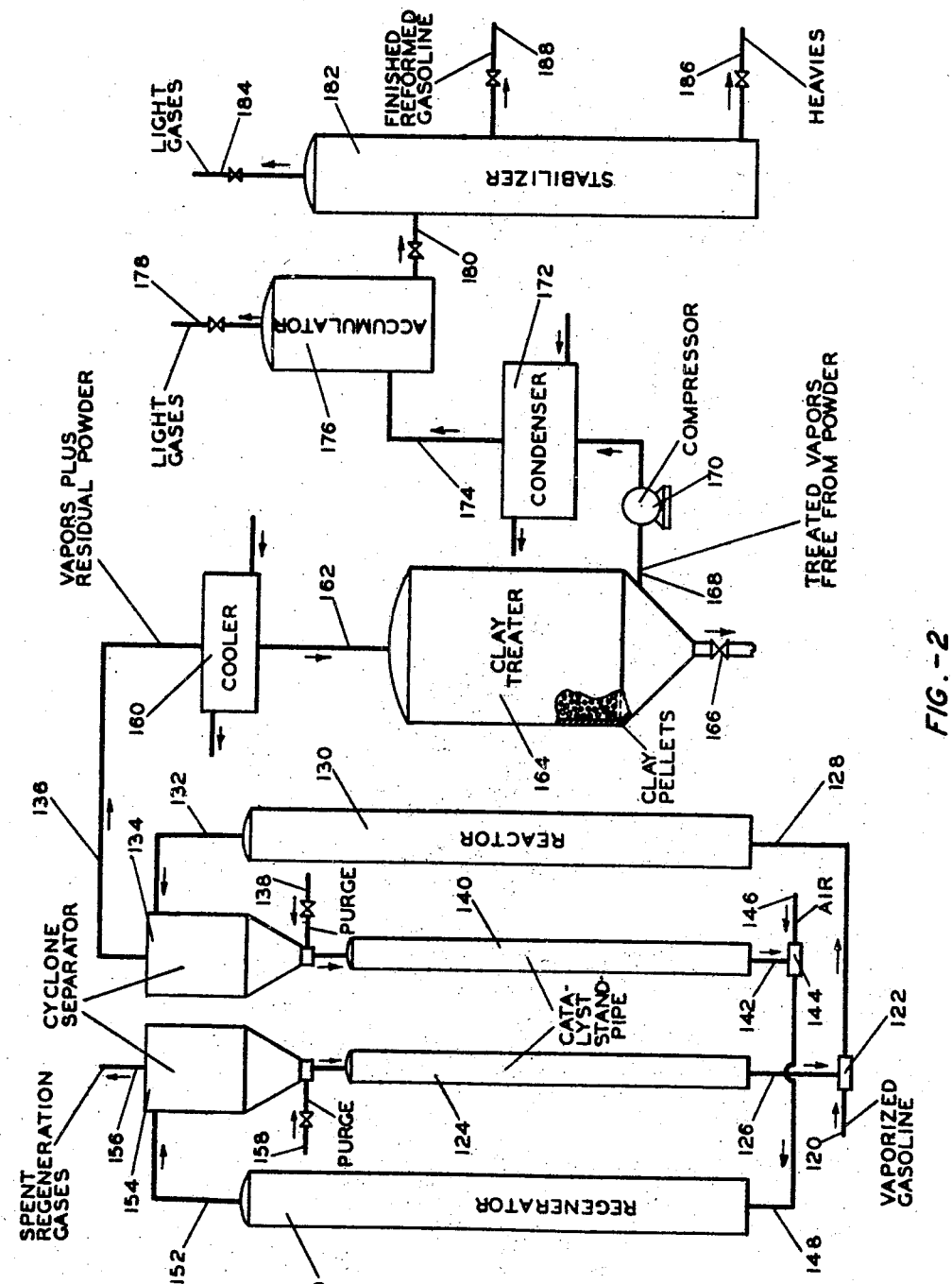

2,436,340

UNITED STATES PATENT OFFICE 2,436,340

CONVERSION OF HYDROCARBONS USING MOVING CATALYSTS

John D. Upham and I. Louis Wolk, Bartlesville, Okla., assignors to Phillips Petroleum Company, a corporation of Delaware Application August 13, 1943, Serial No. 498,560

4 Claims. (Cl. 196—49)

This invention relates to a process and apparatus for effecting contact of mobile solids with fluids. A more particular embodiment relates to the carrying out of catalyzed chemical reactions. It is especially applicable to the catalytic conversion of hydrocarbons, and hence will be described with particular reference thereto.

Many processes for the conversion of hydrocarbon materials to other hydrocarbon and/or non-hydrocarbon materials are now carried out with the aid of catalysts. In fact, catalytic processes, due to their greater selectivity and other advantages, are now displacing almost all types of non-catalytic operations in the petroleum industry. Merely as examples of such conversions may be mentioned the cracking of oils to products of lower boiling point, the formation of products of higher boiling point than the reactants as by polymerization or alkylation, the isomerization, hydrogenation, dehydrogenation, reforming, desulfurization, aromatization, partial oxidation, halogenation, etc., of hydrocarbon materials, which may be essentially pure individual hydrocarbons or mixtures of hydrocarbons. The process and the apparatus of the present invention are applicable to all such processes, as well as to other catalyzed chemical reactions generally. Inasmuch as the catalytic cracking of oils is an important, and in some respects typical, example of hydrocarbon conversion processes, the invention will be described in detail as applied to such a cracking process by way of example.

Heretofore, most cracking processes and other catalytic petroleum conversions were effected in stationary beds of granular catalyst by passing reactants therethrough. After a limited onstream period, it was necessary to shut off the flow of hydrocarbons, or switch same to another bed of active catalyst, due to the deposition of carbonaceous matter on the catalyst particles which deactivated the catalyst to such a degree that the extent of conversion was no longer satisfactory. The catalyst bed was then reactivated in situ by burning the carbonaceous matter with air or other oxygen-containing gas, after which the catalyst was again used in a conversion step. Such processes, due to their intermittent nature, suffer from numerous disadvantages, among which may be mentioned intricacy of control required, lack of uniformity of product due to changes in catalyst activity during each conversion step, difficulties of temperature control for endothermic cracking and exothermic regeneration, and others well known to the art.

In an effort to avoid these difficulties, the use of moving streams of catalyst, rather than stationary beds, has recently come into vogue. In such processes the catalytic material itself is caused to flow continuously in a closed circuit comprising a reaction zone and a regeneration zone, along with purging zones and conduits, elevators, and the like for transferring the catalyst particles between zones. This provides a truly continuous process, the catalyst need be used only at a relatively high and constant level of activity, and temperatures are much easier to control due to the fluent nature of the catalyst mass, particularly if sufficient of the catalyst is used to give the system a high heat capacity.

Two general systems utilizing streams of mobile catalyst have so far attained commercial importance for catalytic cracking. These may be termed the "moving bed" and the "fluid" catalyst systems. In the former, granular catalyst of say from 4 to 60 mesh size is fed from a hopper to the top of a reaction chamber, and after gravity flow therethrough is removed from the bottom by means of a rotary valve or equivalent mechanism. The hydrocarbon material to be converted is usually passed in the vapor phase upwardly through the reactor counter-current to the catalyst flow. Reaction effluents are passed to suitable equipment for separation into the desired products, recycle stocks, and other components. Spent catalyst taken from the bottom of the reactor is purged of residual hydrocarbons and passed to the top of a regeneration zone which may be similar to the reaction zone in construction and operation. The catalyst passes down through the regenerator counter-current to a stream of air or other oxygen-containing gas which removes the carbon by combustion. Catalyst thus regenerated is purged of residual oxygen-containing material and passed by bucket elevators or other means to the top of the reactor for reuse. In systems of this type, attrition of the catalyst particles to form "fines" occurs to a marked extent, the magnitude of which depends on the properties of the particular catalyst used, as well as on reaction and regeneration conditions and on equipment design. Such fines are separated out from the main body of catalyst, and are ordinarily discarded, or re-worked into granular catalyst at considerable expense.

In the so-called "fluid" catalyst system, the solid catalytic material is utilized in the form of a fine powder of say 200 to 300 mesh on down to a few microns in particle size. This powder is preferably "aerated" with gaseous hydrocarbon reactants, purge gases, or regeneration gases to such an extent that it is maintained in a freely-flowing or fluent condition. The catalyst is thus handled much as a liquid would be, and passed continuously in a closed circuit comprising a reaction chamber and regeneration chamber, as well as purging zones, stand-pipes, conduits and the like. Gaseous effluents from reaction and from regeneration zones are passed through cyclone separators or their equivalent to remove suspended catalyst therefrom, which may be returned to the zone whence it came or passed to the other zone. In such processes it is difficult to remove the last traces of the powder from the gas streams referred to. Normally the major portion, such as from 90 to 99 per cent, of the powder is separated out in one or a series of cyclone separators. The residual powder carried out in gaseous effluents of such separators has been a source of considerable trouble. It is either lost entirely from the system, or is recovered by other means which are expensive or which have inherent disadvantages. A small catalyst withdrawal from the system is required, accompanied by introduction of new catalyst make-up, for the purpose of maintaining the average activity of the catalyst, but the amount of residual catalyst escaping from the cyclone separators is greatly in excess of the required withdrawal. One method of recovering residual catalyst from reactor effluents is to pass the latter to a partial condensation or fractionation zone, wherein the catalyst powder may be separated in heavy liquid hydrocarbons condensed therein. When such liquid is recycled to the reactor, the catalyst is also returned, but without being regenerated. Furthermore, this does not allow removal of heavy ends from the system without carrying residual catalyst out therewith. For recovering residual powder from spent regeneration gases electrical precipitation is generally used, which of course is expensive with respect both to initial and operating costs. However, if such methods are not used, an almost prohibitively expensive catalyst loss is incurred, particularly when a synthetic catalyst is utilized.

A primary object of the present invention is to overcome the above mentioned and other disadvantages of mobile catalyst systems. Another object of this invention is to provide process and apparatus for contacting mobile solids with fluids, especially in a continuous manner. A further object is to effect catalyzed chemical reactions. A further object is to carry out the conversion of hydrocarbons catalytically in two or more stages. A still further object is to effect catalytic cracking or reforming of hydrocarbons in a mobile catalyst system, followed by treatment with clay or other refining agent to produce gasoline or like products of high quality simultaneously with removal of powdered catalyst material from effluents of the primary catalytic reaction zone. Another object is to combine a "moving bed" catalyst system with a "fluid" catalyst system in such manner that one complements the other, and difficulties normally encountered with each system are overcome. Still another object is to provide for the recovery and utilization of powdered catalyst not retained by ordinary separating means in a system utilizing the same. A further object is to utilize "fines" from a catalytic system employing moving granules of catalyst, formed by attrition of such granules. Further objects and advantages of the invention will be apparent from the accompanying disclosure and discussion.

The present invention is especially, although not by any means exclusively, applicable to hydrocarbon or other conversions and/or treatments carried out in two or more stages wherein temperature, pressure, contact time, catalyst and/or treating agent, or other variables are different in the different stages. However, in some cases, two stages may be utilized in which reaction conditions are substantially identical. Frequently the total effluent of one stage is treated in another stage, with or without addition of other reactants, but it is within the scope of the invention, and is sometimes preferred, to effect a separation of portions or components of the reaction mixture between stages. By way of example of such multiple-stage processes in the art of cracking hydrocarbons catalytically, to which our invention may be advantageously applied, may be mentioned a number of combinations as described below. Many other such processes, for hydrocarbon conversions or for other chemical conversions, will readily occur to those skilled in the art, and the application of the principles of the present invention thereto will be readily understood in view of the accompanying disclosure. For example, a hydrocarbon oil, such as gas oil, may be cracked catalytically above about 900° F. and at relatively low pressures to produce products containing quite substantial amounts of olefins; the total effluent, or a gasoline fraction thereof, is then subjected to contact with a similar catalyst below about 900° F., generally at a higher pressure and for a longer time, whereby substantially saturated and/or aromatic products are obtained. As another example, a gas oil or the like may be catalytically cracked to produce an olefinic gasoline and the latter, or the total cracking effluent, may be admixed with a saturated oil and contacted with cracking catalyst at a lower temperature and for a longer contact time to saturate the olefinic material. In another instance, a gas oil may be catalytically cracked under low-temperature conditions, and the residuum therefrom cracked catalytically at more elevated temperatures; olefinic gasoline from the latter step may also be passed to the former for saturation. In another two-stage process, a naphtha of substantially gasoline boiling range may be admixed with a higher boiling naphthenic oil and subjected to catalytic reforming conditions, and the resultant products then subjected to catalytic cracking conditions at somewhat lower temperatures and pressures. These are but examples of two-stage cracking processes which may be carried out especially advantageously by utilizing the principles of our invention. Frequently a catalytic conversion step is followed by a step which may or may not be catalytic but which may be termed more specifically a treating or refining, rather than conversion, step. For example a cracked or reformed gasoline, or the total effluent, from a first catalytic conversion step, may be subjected to clay treating to effect a stabilization of the gasoline toward oxidation or the like by selective polymerization or other action of the clay on certain components which may be present in only very minor amounts. A desulfurization may be effected simultaneously, or in a similar manner, with clay and/or metal salts or oxides, either before or after a catalytic conversion of hydrocarbons. Broadly speaking, in the practice of our invention, in each of two or more stages a solid treating material, such as catalyst, refining agent, adsorbent, or the like is utilized which will effect a desirable chemical and/or physical treatment of the hydrocarbon or other material being processed. The solid treating agent may be the same or different in the different stages, as dictated by the particular manner of operating and the product desired, as will more fully appear hereinafter.

Briefly, the invention comprises subjecting hydrocarbons or other reactants to the action of a mobile catalyst, whereby fluid effluents from the reaction zone carry powdered catalytic material in suspension therein. Such effluents, or a portion thereof carrying the catalyst powder, are then passed to a second zone wherein they are contacted with a bed of particulate or granular treating agent, which may be catalytic or non-catalytic, and which may be stationary or flowing, and which has a particle size substantially greater than the powder, such that the fluids may pass therethrough without excessive resistance to flow. In this manner a desired treatment is effected, while at the same time the powdered catalytic material carried out of the reaction zone is separated from the fluids by deposition in said bed, which acts as a filter. The treated material is then obtained free from suspended powder.

In a preferred embodiment of our invention as applied to the catalytic cracking of hydrocarbons, the feed stock is first at least partially cracked in a typical fluid catalyst system, which for the sake of convenience may be designated as system I. The total effluent therefrom is then passed through a cyclone separator or the like for removal of the principal portion of the powdered catalyst as is conventional, and then passed into a typical mobile granular or moving bed catalyst system, which may be referred to as system II. Further hydrocarbon treatment of desired nature is effected therein, while at the same time the residual powdered catalyst carried out of system I by the gas stream is readily filtered out in the moving bed of granular catalyst. Effluents from system II are passed to conventional treatment such as fractionation, etc., to separate out the product or products of the process along with recycle stocks and the like.

Effluent regeneration gases from the catalyst regeneration zone of system I are also passed through the conventional centrifugal separating means such as one or more cyclone separators, and the gases still carrying residual catalyst powder may then, if desired, be handled in the same way as reaction zone effluents from system I, being sent to the regeneration zone of system II; extra oxygen may be added if required.

The granular catalyst from the reaction zone of system II is continuously passed to regeneration and then back to the reactor, and fines are removed from the stream of catalyst either before or after such regeneration by sifting or other suitable means. These fines comprise powdered catalyst carried over from system I plus fines formed by attrition of granular catalyst in system II. In the preferred embodiment, the catalyst material is the same in the two systems except for particle size, although there are cases in which this is not required. The thus separated fines are now sent to system I as catalyst.

Since cracking or other catalyst, regardless of efficient regeneration, finally becomes too old for efficient use and must be discarded, it is sometimes best to remove continuously from the system a small portion of the catalyst and supply fresh make-up catalyst continuously. The present process may be operated so that no powdered catalyst make-up is required, the entire make-up being provided in the granular form to system II, while fines therefrom provide the withdrawal from system II and the make-up for system I. Small portions of fines or of powdered catalyst from system I may be continuously removed and discarded or recovered chemically. Another desirable manner of operating is to supply system II with fresh granular catalyst as required, and also to send the fines from catalyst manufacture, which are ordinarily difficult to utilize, into system I. Of course, in all cases, the powder sent to system I is preferably screened to the proper particle size for use therein. Sufficient powder may be removed in the spent regeneration gas vent or otherwise to balance the catalyst make-up being supplied.

In case it is preferred to reverse the order of treatment, or in case it is preferred not to follow the fluid catalyst treatment with granular catalyst treatment, effluents from system I may be contacted with a flowing bed of granular catalyst in a zone separate from the reaction zone of system II or in a zone similar to such a zone as the case may be, but under non-reaction conditions.

In order to provide a more complete understanding of the invention, the accompanying drawings and description thereof are provided. Figure 1 shows in somewhat diagrammatic form a preferred arrangement of equipment which will serve to illustrate and also exemplify a preferred modification of the invention as applied to the catalytic cracking of hydrocarbons. Figure 2 shows diagrammatically another arrangement of equipment, particularly suitable for carrying the invention into effect in the catalytic reforming of naphthas and gasolines. It will be appreciated that the representations are merely schematic, that no attempt has been made to proportion the various units exactly to scale, and that in order to simplify the drawings numerous auxiliary items, such as fractionators, pumps, compressors, heaters, condensers, heat exchangers, valves, control instruments and the like, have been omitted, as their use is well understood by one skilled in the art once given the detailed disclosure provided herein. Accordingly the drawings and examples are not to be construed as unduly limiting the scope of the invention.

Referring now to Figure 1, system I comprises a reactor 10 and a regenerator 12 along with auxiliary elements, interconnected as shown. The hydrocarbon feed stock to be cracked, such as a full range straight run gas oil, is preheated, and if desired partially or completely vaporized, by means not shown, and passed through line 16 into conduit 18, which carries hot, active powdered catalyst from regenerator 12 to reactor 10. Usually the heat contained in the regenerated catalyst as a result of the combustion of carbon thereon in regeneration zone 12 is utilized to at least complete the vaporization of the charge stock. The vapors thus introduced into and/or generated in conduit 18 causes the catalyst to flow by gas lift action into reaction zone 10 along with the hydrocarbons. Flow rates are chosen so that the gas oil is maintained within chamber 10 for the required time at the proper temperature to effect the desired extent of cracking, for example for 5 to 50 seconds at 850 to 1050° F. In the reaction chamber shown (and also in regeneration chamber 12), an aerated bed of catalyst is maintained in the bottom of the chamber, the level of which is indicated at 20. This catalyst level is readily adjustable to help control the effective contact time of the gases passing upwardly therethrough. The bed of catalyst in chamber 10 is constantly in motion, with catalyst being continuously introduced via conduit 18, passing over weir 22, and then out through conduit 24 for passage to regeneration zone 12. Other systems utilizing powdered catalyst may also be used, such as those wherein all, rather than part, of the catalyst is carried entirely through a reaction zone suspended in gases, and separated from the latter at the exit of the reaction zone. In any case, vaporous effluents comprising cracked and uncracked material exit from the top of chamber 10 via line 26, carrying a substantial amount of powdered catalyst suspended therein. These effluents are passed to cyclone separator 28, wherein most of the residual catalyst particles are separated from the vapors and subsequently returned to chamber 10 via line 30. While only one cyclone separator is shown, more may of course be used, generally in series. It is in fact now customary to use a series of at least four cyclone separators, which still fail to remove the last traces of fine powder from the gases. However, due to the advantages of our invention, one cyclone is generally sufficient and even that may in some cases be dispensed with, all the carried-over catalyst being separated in system II to be described.

The conversion effluents from system I, generally after having been freed of the major portion of catalyst powder suspended therein by passage through cyclone separator 28 but still carrying fines not removed by this passage, are taken via line 32, or otherwise as will be described below, to the bottom of reactor 34. Reaction chamber 34 and regeneration chamber 36 are constructed in known manner to provide for the flow of reactants and regeneration gases, respectively, upwardly therethrough countercurrent to a downwardly moving bed of particulate catalyst, which generally ranges in particle size from say 4 to 60 mesh, much larger than the catalyst particles used in system I, which are generally not greater in size than about 200 mesh, and frequently are much smaller. Associated with the top and bottom of chambers 34 and 36 are hoppers, rotary valves or the equivalent, and other elements required to effect the flow of catalyst and of gases through the system. However, these units, being known to the art, are not illustrated, since they would only add to the complexity of the drawing without aiding in an understanding of the invention. Catalyst elevators 38 and 40 of any known design, such as buckets on an endless chain, are provided for transferring spent catalyst from the base of reactor 34 to the top of regenerator 36 and for transferring hot reactivated catalyst from the base of regenerator 36 to the top of reactor 34, respectively.

Reaction effluents from system I may be passed directly to system II via line 32 and valves 42 and 44 in case further conversion is to be effected therein within substantially the same temperature range as that employed in system I. However, it may be preferred to heat or cool such material prior to its entry into reaction zone 34, in which case a portion or all may be by-passed through heat-exchange unit 46 by partially or completely closing valve 42 and opening valves 48 and 50 in lines 52 and 56 respectively. It may be desired to effect a product separation at this point, in which case effluents from reactor 10 of system I pass from cyclone separator 28 to means indicated diagrammatically by unit 58 on the drawing either by way of line 32, valve 42, line 56, valve 50, and valve 60, or by way of line 52, valve 48, heat exchange element 46, line 54, and valve 60. Unit 58 may comprise partial condensers, fractionators, and/or other equipment readily supplied by one skilled in the art for effecting any particular desired separation. A portion of the material, such as one or more products and/or by-products, may be removed as through lines 62 and 64, with any other desired portion or fraction carrying residual catalyst powder continuing on to system II through line 66, line 67, valve 69, and line 32, and/or through line 66, vaporizer 71, line 73, and line 32. As an example, the total reaction effluents resulting from cracking of gas oil in system I may be passed through heat exchange unit 46 and cooled therein to effect a partial condensation. In separation unit 58 a cycle oil may be separated as a liquid phase, containing the residual powdered catalyst, in the bottom of a separator or fractionator. This liquid may then be vaporized, still carrying the residual catalyst, as by passage through line 66 and vaporizer 71, and the resultant vaporous suspension of powdered catalyst in hydrocarbons passed through lines 73 and 32 to system II for additional cracking therein. Light gases and a gasoline product may be recovered through lines 62 and 64. Whenever required or preferred, additional reactants may be introduced via line 68 into the stream passing to system II in order to modify the reaction therein and/or to operate the same at full capacity. Such added material may be at a temperature above or below that of the stream carrying residual catalyst, and thus act to effect a desired temperature change therein. The pressure maintained in reactor 34 may be equal to, higher than, or lower than that prevailing in reactor 10. Suitable adjustment may be made if desired by allowing a pressure drop across one or more valves in the lines between the two reactors, or by one or more pumps or compressors not shown in the drawing.

In reactor 34, the granules of catalyst move downwardly by gravity, the rate of flow of the bed being controlled by a catalyst outlet valve or the like at the bottom. Fluid entering the bottom via line 32 and carrying suspended therein a fine catalytic powder carried over from system I, flows upwardly through reactor 34 countercurrent to the moving bed of catalyst, and any desired conversion or treatment, such as cracking, is effected. The temperature may for example range from 350 to 1250° F., or even much lower or higher for particular conversions, and in the case of cracking will preferably be within the limits of about 750 to 1150° F., depending on the feed stock, residence time, catalyst to oil ratio, and type of product preferred. Additionally, the powder referred to is quite effectively filtered out by the bed of catalyst granules, so that the fluid effluents from reactor 34 are obtained substantially completely free from fines. These effluents, comprising hydrocarbon conversion products, are passed via line 114 to conventional fractionation and/or other treatment. In the case of gas-oil cracking, one or more cracked gasoline cuts, which may be relatively saturated and aromatic, or relatively unsaturated, depending upon the reaction conditions employed in system I and in system II, but which in any case will have good antiknock properties, are obtained, along with light gases and material heavier than gasoline, either or both of which in some cases may be recycled to one or both systems for additional conversion.

Turning now to the catalyst regeneration step in system I, an oxygen-containing gas, which may be air, a flue gas containing controlled percentages of oxygen, air diluted with steam, or the like, is introduced via line 70 into conduit 24, and carries the spent powdered catalyst therein up into regeneration zone 12 by gas-lift action. In zone 12 all or part of the carbonaceous matter deposited on the catalyst during the conversion in zone 10 is burned off by the oxygen of the regeneration gas, with the liberation of large quantities of heat. The thus-regenerated catalyst, while still hot, continuously flows over weir 72 and down through conduit 18, through which, after meeting the gas oil or other reactant introduced through line 16, it is again lifted into reactor 10 for reuse. The catalyst itself thus transfers heat from the exothermic regeneration to the endothermic conversion. If an excess of heat over that required in zone 10 is liberated, it may be removed by suitable heat exchange (not shown) known to the art.

Partially or completely spent regeneration gases, carrying a considerable amount of the catalyst powder in suspension, leave the top of regenerator 12 through line 74 and may be passed through one or more cyclone separators 76, wherein a substantial proportion of the suspended catalyst is separated from the gas and returned to the regenerator 10 through line 78. If the amount of residual catalyst in the gases leaving separator 76 through line 80 is not greater than the amount of catalyst withdrawal required for the system, the gases may be vented through line 82. However, this is seldom the case, and accordingly at least a part of these gases carrying suspended residual catalyst are preferably taken via line 84 into system II for introduction at the bottom of regenerator 36. Oxygen-containing gas may be added to these gases via line 86 if necessary, and/or other regeneration gases may be introduced via line 88 for the purpose of effecting regeneration of the moving bed of spent granular catalyst in regenerator 36. Gas passing from system I to system II may be cooled by means not shown intermediate the two systems if necessary to avoid overheating in regenerator 36. Oxygen-containing gas passing upwardly in regenerator 36 counter-current to the moving bed of catalyst therein effects combustion of carbonaceous deposits, and the thus regenerated catalyst passes out at the bottom via line 90. Any fines carried over from system I are readily picked up by the larger catalyst granules in regenerator 36, and spent regeneration gas leaving the top via line 92 is effectively filtered free from residual catalyst. Although the flow of fluid in zones 34 and 36 has been described as counter-current to the flow of catalyst granules therein, and although this is preferable both with respect to the filtering action and with respect to the conversion or regeneration being effected in said zones, such fluids may also be passed concurrently with the flow of the bed of granular catalyst without departing from the broad scope of the invention.

The regenerated particulate catalyst passes from line 90 to a sifter or other means 94, wherein a classification of matter is effected. This sifter or similar device may be located at any other point in system II, such as in line 38, if desired. Fines, of the desired mesh size, are separated therein from the main body of granular catalyst, which latter is then picked up by elevator 40 and passed to reactor 34 for re-use. The fines separated out in sifter 94, and which comprise residual powder recovered from effluents of system I in reactor 34 and/or in regenerator 36 as described, along with fines produced by attrition of the granular catalyst in system II, are passed to system I through conduit 96, aided if desired by gaseous reactants, steam or the like introduced thereinto via line 98 for effecting gas-lift of the powder. As explained heretofore, this may comprise the total catalyst make-up required for system I, and/or the total catalyst withdrawal from system II.

Fresh granular catalyst make-up for system II may be introduced at any desired point, as by way of line 100. Catalyst withdrawal from both systems may be by way of spent regeneration gases withdrawn from system I via line 82, or line 102 may be provided, or in any other manner. Line 104 may be provided for withdrawing catalyst from system II, but this is seldom required. It will be seen that by means of our invention we not only recover catalyst from system I and return the same thereto, but we also utilize in a highly advantageous manner the fines produced by attrition of particles in system II.

In order to purge the various catalyst streams of residual hydrocarbons or residual oxygen-containing material, as the case may be, prior to their introduction into other zones, steam or other relatively inert material may be passed through such streams in any known manner, for example as shown in the drawing, wherein lines 106, 108, 110, and 112 are provided, or in specially constructed purging zones as desired.

As cracking catalyst may be utilized any of the naturally occurring or synthetic solid catalytic materials known to the art, the choice being made on the basis of the charge stock, the particular reactions to be catalyzed, the reaction conditions, and the economics of any given situation. Merely as examples may be mentioned the so-called silica-alumina type catalysts, which comprise natural clays containing silica and alumina, usually along with other materials such as other metal oxides, and which are frequently subjected to acid or other treatment to enhance their catalytic activity and selectivity, or which may be artificially prepared such as by effecting in various known ways an intimate association of hydrated silica with hydrated alumina and/or zirconia or other metal oxides, followed by subsequent purifying or activating treatment and drying. Such catalysts and others, being well known in the art of hydrocarbon conversion, need not be discussed here at greater length, the choice for any given reaction being well within the skill of the art.

As a further example of the application of the principles of our invention to a somewhat different hydrocarbon conversion, the catalytic reforming of gasoline will be described as shown in Figure 2. The gasoline to be reformed is vaporized by means not shown and may be admixed with hydrogen if desired, depending upon the particular type of feed stock and upon the type of product to be produced. Charge vapors are introduced via line 120 to injector means 122 in which a powdered reforming catalyst drawn from stand-pipe 124 via line 126 is continuously picked up by the vapor stream in proper quantities. The resulting mixture is passed via line 128 into reactor 130. As catalyst may be used powdered bauxite, powdered chromium oxide gel, powdered chromia-alumina or molybdenum oxide-alumina, or any other suitable reforming catalyst known to the art. The reactants are maintained in contact with the catalyst in reactor 130 for sufficient time to obtain the desired improvement in octane number. This time may range from one to fifty seconds or even considerably more at temperatures from 850 to 1050° F. depending on the catalyst and upon the products desired, the precise conditions being readily chosen by one skilled in the art. Total reactor effluents comprising conversion products plus powdered catalyst pass via line 132 into cyclone separator 134 wherein almost all the catalyst is separated, while the vapors which, however, still contain traces of the catalyst powder exit via line 136. The spent catalyst separated in cyclone 134 passes by gravity first through a stream of steam or other purge medium introduced through line 138 and then into catalyst stand-pipe 140. Spent catalyst from the bottom of this stand-pipe passes via line 142 into injector 144 where it is picked up by a stream of air introduced through line 146 and the admixture passed via line 148 to regenerator 150. Carbonaceous matter is burned from spent catalyst and hot regeneration effluents pass via line 152 to cyclone separator 154. Spent regeneration gases exit through line 156 while the now active catalyst is purged by steam or the like introduced via line 158 and then passes into stand-pipe 124 for reuse.

The hot reaction products carrying residual powdered catalyst in line 136 are passed through cooling means 160 wherein they are reduced in temperature, for example, to a value of about 500° F. The thus cooled material then passes through line 162 into clay treater 164 which contains a bed of pellets made up from an adsorptive bleaching earth, preferably acid-treated, or other similar suitable treating material known to the art. These clay pellets are of substantial particle size, for example such that they will just be retained on a 4-mesh screen. If desired the hydrocarbons may be largely condensed to liquid in cooler 160 prior to contact with the clay, but vapor phase treatment is usually preferred. The hydrocarbon material passes down through a considerable depth of the clay pellets and in so doing the residual powdered catalyst is deposited on the pellets. The contact time in clay treater 164 is sufficient to effect as complete a stabilization of the gasoline product as desired with respect to color and oxidative or other deterioration in storage. Any polymer formed, as well as spent clay, may be withdrawn through valve 166 whenever required. The treated powder-free vapors leave clay treater 164 via line 168, are compressed by compressor 170, cooled in condenser 172 and the resulting material passed through line 174 into accumulator 176. Light gases such as hydrogen and methane are drawn off through line 178 while the liquid passes via line 180 into stabilizing fractionator 182. From this fractionator light gases such as C₃ and lighter, and some C₄ if desired, are removed via line 184, heavies are removed via line 186, and the finished reformed gasoline is obtained as a product through line 188.

Any powdered catalyst retained in effluent regeneration gases in line 156 may be recovered by any desired means not shown. Preferably, however, the exit regeneration gases are passed by means not shown through a bed of spent clay to separate out the catalyst, and the clay may or may not be simultaneously regenerated, as desired. Spent clay may be discarded if and when desired, along with powdered catalyst deposited therewith during the clay-treating and/or regeneration steps. Such powder may be recovered from the clay by sifting or otherwise, rather than being discarded, if economic considerations warrant.

While two specific embodiments of our invention have been described in some detail, various modifications may of course be practiced without departing from the spirit of the invention. By "granular" treating material as used in the present disclosure and accompanying claims, we refer to any solid particles such as pellets, pills, small spheres, particles obtained by crushing and sizing, etc., which are of appreciably greater particle size than that of the powder which it is desired to recover from the fluid streams. Preferred examples of particle sizes for granules and for powder have been given, but sizes outside these ranges may also be used. Frequently rough granules, such as those obtained by crushing, may be found to be somewhat better than others in retaining powder. The invention will in some cases be applicable to treating effluents from a moving bed catalyst system such as when an unusually high velocity of gases passed therethrough causes attrition fines to be picked up thereby. It may also be applied with suitable modifications to other systems wherein a finely divided powder is suspended in fluids, as for example a powdered absorbent material or reactant suspended in a gaseous medium. These and many other modifications and applications of the invention will be apparent from the present disclosure to those skilled in the art.

We claim:

1. In a catalytic hydrocarbon conversion system, the improvement which comprises effecting catalytic hydrocarbon conversion in at least two stages under conditions causing deposition of carbonaceous material on the catalysts, utilizing a moving bed of granular catalyst in at least one of said conversion stages and a finely powdered catalyst of smaller particle size in another of said conversion stages, regenerating said granular catalyst in a moving bed in at least one regeneration stage by contact with hot oxygen-containing regenerative gases, regenerating said finely powdered catalyst in another regeneration stage by contact with hot oxygen-containing regenerative gases, and passing effluent regenerative gases containing powdered catalyst suspended therein from said last-named regeneration stage into said first-named regeneration stage whereby said suspended powdered catalyst is separated from said regenerative gases by incorporation in said bed of granular catalyst.

2. A process for converting hydrocarbons which comprises passing a hydrocarbon fluid at conversion conditions in contact with a powdered solid catalyst in a first reaction zone, passing fluid from said first reaction zone carrying suspended powdered catalytic material therein into a second reaction zone at conversion conditions countercurrent to a moving bed of granules of the same catalytic material but of particle size substantially greater than that of said powder whereby conversion is effected and said powder is separated from said fluid by incorporation with said granular catalyst, recovering said fluid substantially free from powder, separating from said granular catalyst powdered catalyst consisting of powder carried over from said first reaction zone and powder formed by attrition of said granules by movement through the system and passing thus-separated powdered catalyst to said first reaction zone, passing the principal portion of powdered catalyst utilized in the first reaction zone into a first regeneration zone wherein carbonaceous matter deposited thereon during the hydrocarbon conversion is removed by contact with hot oxygen-containing regenerative gases, passing thus-regenerated powdered catalyst back to the first reaction zone, passing hot regenerative gases from said first regeneration zone and carrying suspended powdered catalyst therein into a second regeneration zone, passing granular catalyst from said second reaction zone into said second regeneration zone countercurrent to said hot regenerative gases and in the presence of oxygen whereby said granular catalyst is regenerated by oxidation of carbonaceous material deposited thereon during the hydrocarbon conversion and said powder suspended in said hot regenerative gases from said first regeneration zone is separated from said gases by incorporation with said granular catalyst, separating powdered catalyst from thus-regenerated granular catalyst and passing same to said first reaction zone and returning thus-regenerated granular catalyst to said second reaction zone.

3. A process according to claim 1, wherein said effluent regenerative gases containing powdered catalyst suspended therein also contain oxygen which serves to effect regeneration of said granular catalyst.

4. A process according to claim 1, wherein catalyst of the same composition but of different particle size is used in said stages, and powdered catalyst comprising powder carried over from said powdered catalyst stage and powder formed by attrition of said granules by movement through the system is separated from said granular catalyst and passed to said powdered catalyst stage.

JOHN D. UPHAM.
I. LOUIS WOLK.

REFERENCES CITED

The following references are of record in the file of this patent:

UNITED STATES PATENTS

| Number | Name | Date |
| --- | --- | --- |
| 1,773,180 | Herthel et al. | Aug. 19, 1930 |
| 1,995,293 | Clark | Mar. 26, 1935 |
| 2,302,328 | Kelly | Nov. 17, 1942 |
| 2,319,710 | Stratford et al. | May 18, 1943 |
| 2,325,611 | Keranen | Aug. 3, 1943 |
| 2,302,209 | Goddin, Jr. | Nov. 17, 1942 |
| 2,377,512 | Page | June 5, 1945 |
| 2,377,513 | Page | June 5, 1945 |
| 2,317,766 | Hewlett et al. | Apr. 27, 1943 |
| 2,339,874 | Nysewander | Jan. 25, 1944 |
| 2,400,645 | Huff | May 21, 1946 |
| 2,396,709 | Leffer | Mar. 19, 1946 |
| 2,411,208 | Hall et al. | Nov. 19, 1946 |

FOREIGN PATENTS

| Number | Country | Date |
| --- | --- | --- |
| 23,045 | Great Britain | Aug. 24, 1911 |